(12) United States Patent
De Jong et al.

(10) Patent No.: US 8,225,948 B2
(45) Date of Patent: Jul. 24, 2012

(54) PLANT FOR TRANSPORTING CARGO AND/OR FROM A SHIP

(75) Inventors: Angelo De Jong, Vleuten (NL); Laurids Uglvig, Sotogrande (ES); Anders Kjeldsen, Sotogrande (ES); Michael Alex Jordan, Oakland, CA (US)

(73) Assignee: APM Terminals Management B.V., HW Den Haag (NL)

( * ) Notice: Subject to any disclaimer, the term of this patent is extended or adjusted under 35 U.S.C. 154(b) by 524 days.

(21) Appl. No.: 12/307,069

(22) PCT Filed: Nov. 19, 2007

(86) PCT No.: PCT/EP2007/009987
§ 371 (c)(1),
(2), (4) Date: Feb. 10, 2009

(87) PCT Pub. No.: WO2008/058763
PCT Pub. Date: May 22, 2008

(65) Prior Publication Data
US 2009/0208312 A1    Aug. 20, 2009

(30) Foreign Application Priority Data
Nov. 17, 2006  (EP) .................................. 06388062

(51) Int. Cl.
*B66C 17/00* (2006.01)
*B63B 27/00* (2006.01)
(52) U.S. Cl. ..................................... 212/316; 414/141.3
(58) Field of Classification Search .................. 212/286, 212/294–295, 299–300, 309, 316–318, 324; 414/137.1, 138.7, 139.4, 139.8–139.9, 140.2–140.5, 414/141.3–141.7, 142.6, 561–562, 626
See application file for complete search history.

(56) References Cited

U.S. PATENT DOCUMENTS
660,031 A * 10/1900 Seaver .......................... 212/316
(Continued)

FOREIGN PATENT DOCUMENTS
EP          0 318 264 A1    11/1988
(Continued)

OTHER PUBLICATIONS
International Search Report for PCT/EP2007/009987, mailed Jan. 30, 2008.

*Primary Examiner* — Gregory Adams
(74) *Attorney, Agent, or Firm* — Brinks Hofer Gilson & Lione

(57) ABSTRACT

A plant (1;20) for transferring cargo (23) to and from a ship (24), said plant comprising an elevated rail structure (2) and a crane unit (3) where the elevated rail structure (2) is arranged on one side of the ship (24) and comprises a longitudinal rail (6) which extends essentially parallel to the longitudinal axis of the ship and where the crane unit is arranged to transfer a load or a group of loads to and from said ship, is supported by said longitudinal rail and is displaceable along said longitudinal rail. The crane unit furthermore comprises a boom (10) and a trolley (21) where the boom of said crane unit extends essentially perpendicular to the longitudinal rail such that one end of the boom extends over the ship; and where the boom of said crane unit comprises a transverse rail (13) which extends in a direction which is essentially transverse to the longitudinal rail and essentially parallel to the centre line of the boom. The trolley is displaceably connected to said transverse rail of said boom and the trolley of said crane unit comprises a lifting device (22) for lifting said load or said group of loads. Furthermore, the transverse rail (13) of said boom (10) is arranged underneath said longitudinal rail (6) of said elevated rail structure (2). In this way, the trolley can move back and forth along the transverse rail without any hindrances.

17 Claims, 12 Drawing Sheets

U.S. PATENT DOCUMENTS

| | | | | |
|---|---|---|---|---|
| 756,932 | A | * | 4/1904 | Browning ............... 212/316 |
| 1,079,519 | A | * | 11/1913 | Sawyer ............... 212/299 |
| 1,111,100 | A | * | 9/1914 | Sawyer ............... 212/286 |
| 1,305,802 | A | * | 6/1919 | Hulett ............... 414/141.7 |
| 1,373,464 | A | * | 4/1921 | Titcomb ............... 212/325 |
| 1,436,861 | A | * | 11/1922 | Collins ............... 212/316 |
| 1,547,536 | A | * | 7/1925 | Van Der Graaf et al. .. 414/140.3 |
| 4,435,118 | A | * | 3/1984 | Behrend et al. ............ 414/744.5 |
| 4,569,453 | A | * | 2/1986 | Oustad ............... 212/299 |
| 5,951,226 | A | * | 9/1999 | Fantuzzi ............... 414/141.3 |
| 6,698,990 | B1 | * | 3/2004 | Dobner et al. ............ 414/139.9 |
| 2002/0071743 | A1 | | 6/2002 | Amoss, Jr. |

FOREIGN PATENT DOCUMENTS

| | | |
|---|---|---|
| EP | 0 790 955 B1 | 9/1995 |
| JP | 05-338991 | 12/1993 |
| JP | 2003-292166 | 10/2003 |
| WO | WO 2004/022474 A1 | 3/2004 |
| WO | WO 2005/012149 A1 | 2/2005 |

* cited by examiner

PLANT FOR TRANSPORTING CARGO AND/OR FROM A SHIP

This application is a filing under 35 U.S.C. §371 International Patent Application PCT/EP2007/009987, filed Nov. 19, 2007, and claims priority to European Patent Application No. 06 388 062.9, filed Nov. 17, 2006.

The current invention relates to a plant for transferring cargo to and/or from a ship. The plant is of the type which comprises an elevated rail structure and a crane unit, where the elevated rail structure is arranged on one side of the ship and comprises a longitudinal rail which extends essentially parallel to the longitudinal axis of the ship and where the crane unit is arranged to transfer a load or a group of loads to and/or from said ship, is supported by said longitudinal rail and is displaceable along said longitudinal rail. The crane unit furthermore comprises a boom and a trolley connected to the boom, where the boom of said crane unit extends essentially perpendicular to the longitudinal rail such that one end of the boom extends over the ship and comprises a transverse rail which extends in a direction which is essentially transverse to the longitudinal rail and essentially parallel to the centre line of the boom. The trolley is displaceable along said transverse rail of said boom and comprises a lifting device for lifting said load or said group of loads.

In this context it should be mentioned that some plants for unloading cargo from ships comprise cranes and/or elevated rail structures which straddle the ship. Plants like this therefore have support elements on both sides of the ship. The current plant comprises an elevated rail structure which is only arranged on one side of the ship and where the crane unit extends outwards from the elevated rail structure and over the ship. In this way, a wharf only needs to be established on one side of the ship, instead of two. Establishing a wharf on two sides of the ship would be expensive and in many cases, not possible.

It should also be mentioned that in the context of this specification, the basic plant comprises one longitudinal rail and one crane unit, however, it should be obvious to the person skilled in the art that plants according to the current invention could comprise multiple rails, multiple crane units, etc. . . . Therefore, for example, the wording "a crane unit" when used in the claims should be understood for the purpose of this specification as "at least one crane unit". The same is true for the other elements of the plant.

The person skilled in the art will also understand that the term "cargo" should be widely interpreted. Cargo in the scope of this specification could comprise many different items, for example containers, bulk materials, cars, etc. . . .

It should also be mentioned that the terms longitudinal and transverse are used in relation to the ship. Therefore, the "transverse rail" on the boom of the crane unit is called "transverse" because it is transverse to the longitudinal axis of the ship.

Furthermore, it should be mentioned, that the wording "essentially" or "essential" shall be interpreted as being of an amount which fulfils the requirements of the invention. For example, the term "essentially parallel" should be interpreted as being close enough to parallel such that the plant works according to the invention. The person skilled in the art is able to make this distinction.

DESCRIPTION OF RELATED ART

Plants for loading and/or unloading cargo from ships have been used for many years. One common application for such plants is the loading and/or unloading of containers from ships. Such plants usually comprise a ship to shore container crane arranged on the wharf, which during unloading of the ship lifts the containers one by one off the ship and deposits them on either a wharf, a truck, a train, a container handling system, etc. . . . The same ship to shore container crane is usually also used for lifting the containers from a wharf, truck, train, etc. . . . and onto the ship during the loading of the ship.

Containers are usually arranged on a ship with their longitudinal axis arranged parallel to the longitudinal axis of the ship. The containers are furthermore arranged in a number of side by side "container bays". A container bay comprises a number of vertical stacks of containers arranged along a line which is transverse to the longitudinal direction of the ship. Since the containers are arranged in container stacks, ship to shore container cranes are usually arranged with a mechanism which allows the container crane to move along a track which is arranged parallel to the longitudinal axis of the ship, or in other words along a track which is parallel to the waterline of the wharf. Such mechanisms usually comprise wheels which roll on a track or on a rail. The rail or track is usually arranged on the wharf. In this way, the container crane can move along the wharf thereby allowing a single crane to work on many different container bays of a single ship. Furthermore, since the container crane can move along the wharf, the wharf can service ships of many different sizes It is furthermore possible to arrange more than one crane on the track or rail. In this way, multiple cranes can work on the same ship simultaneously. This speeds up the loading and the unloading procedure.

There are many examples of different ship to shore container cranes of this type. Three example disclosures are WO 04 022474, JP 2003 292166, and US 2002 071743.

One of the problems with container cranes of this type is that the container cranes are relatively heavy and the ground on which the crane is supported must be reinforced very strongly. Since the crane usually moves right at the edge of the wharf, the water side edge of the wharf needs to be reinforced very well in order to prevent the wharf from collapsing under the loads exerted on the wharf by the crane. The reinforcing of the wharf is usually expensive and complicated.

One of the ways of minimizing this problem is to lift the crane above the wharf and arrange it on an elevated rail. The elevated rail is supported by a structure which is supported on the ground by foundations which are established at predefined points. In this way, it is not necessary to build a very strong wharf, rather, it is only necessary to establish a limited number of strong point foundations to support the structure which supports the elevated rail. EP 0 790 955 B1 discloses such a system.

Another problem with current container cranes is that it is not possible to work on two side by side container bays at the same time since currently available cranes are too wide (in the direction which is parallel to the longitudinal axis of the ship). Typical cranes are typically up to 27 m wide, whereas typical containers are either 20 feet (6.10 metres) or 40 feet (12.19 metres) long. Current container cranes are wider than the width of a container, since the container needs to be able to pass between the "legs" of the container crane. This means that the distance between the legs of the container crane needs to be larger than the length of a single container. One solution to this problem is to arrange more than one boom on a single container crane. Such a solution is shown in EP 0 318 264 A1. By arranging two or more booms on a single container crane, the container crane is able to work on two or more adjacent bays simultaneously. A similar crane with eight booms is disclosed in JP 5-338991. However, this solution requires a very large and expensive container crane structure. This further increases the loads on the wharf. Furthermore, it is not always desired to have two or more booms arranged side by side. There is also a problem in this solution in that the gap between container bays on different ships can be different. The gap can be in the area of about 0.5 to 2 m, depending on the ship. This means that a crane unit having multiple booms with a fixed spacing between booms is very inflexible for the wharf and severely limits the terminal logistics which can be employed.

Another solution to the problem of working on two side by side container bays is to arrange cranes on both sides of the ship. In this way, a first container bay can be accessed from one side of the ship while the adjoining container bay is accessed from the other side of the ship. However, this requires the construction of two side by side wharfs which is also very expensive. A solution of this type is disclosed in WO 2005 012149 A1.

SUMMARY OF THE INVENTION

It is therefore an aspect of the current invention to provide a plant as mentioned in the introductory paragraph which allows two side by side container bays to be emptied or filled simultaneously from the same side of the ship.

It is another aspect of the current invention to provide a plant as mentioned in the introductory paragraph which is very flexible and can assume many different configurations.

These aspects are provided in part by a plant as mentioned in the opening paragraph where the transverse rail of the boom is arranged underneath the longitudinal rail of the elevated rail structure. In this way, the trolley is free to move along the entire length of the transverse rail, without any hindrances.

In one advantageous embodiment, the plant can comprise at least two crane units supported on the same longitudinal rail of the elevated rail structure. Since the crane units are supported by an elevated rail structure, the crane units do not have any "legs" and as such the container is not restricted from moving along the transverse rail by the legs of the cranes. This allows the crane units to be made narrower than the width of a typical container bay. In this way, two crane units can simultaneously work side by side on two side by side container bays.

In a typical embodiment, the elevated rail structure can comprise a number of vertical pillars which support the longitudinal rail, the vertical pillars being supported by individual foundations. This means that during the building of the plant, it is not necessary to build a very strongly reinforced wharf. Rather, only a limited number of individual strong foundations need to be constructed.

In a typical embodiment, the plant could further comprise a system of roads and/or rails whereby vehicles can transport cargo to and/or from the crane unit. However, the plant could also be a part of a large freight handling plant where cargo is transported directly from the ship to the freight handling plant.

In order to handle the case where a container bay is located inline with a vertical pillar, the plant can comprise at least one road and/or rail which is arranged between the elevated rail structure and the water. In this way, containers from this container bay can be loaded to and/or from a position in front of the vertical pillar. A road and/or rail arranged between the elevated rail structure and the water could also be used as a ship access lane. This could provide technicians, workers, sailors, etc easy access to the ship without disturbing the loading/unloading of the cargo.

Furthermore, the boom and/or the transverse rail can comprise a section which is openable in order to allow the boom and/or said transverse rail to pass a vertical beam of the elevated rail structure.

In one embodiment, the section can be rotatably arranged around an axis which is perpendicular to the longitudinal rail and perpendicular to the transverse rail. In another embodiment, the section can be rotatably arranged around an axis which is parallel to the longitudinal rail. However, it should be obvious to the person skilled in the art, that many other types of moveable sections could be imagined.

In a preferred embodiment, the length of the longitudinal rail can be made greater than two times the width of the crane unit, preferably greater than three times the width of the crane unit, and most preferably greater than four times the width of the crane unit. The longitudinal rail can also be as long as the wharf and extend the entire length of the ship.

In one embodiment, the elevated rail structure could comprise two longitudinal rails: the two longitudinal rails comprising a shipside longitudinal rail and a dockside longitudinal rail. This provides a stable platform for the crane units.

In one preferred embodiment, the dockside longitudinal rail could be arranged underneath the boom and/or the transverse rail and the waterside longitudinal rail could be arranged above the boom and/or the transverse rail. In this way, the containers can be run all the way to the dockside longitudinal rail, past the waterside longitudinal rail. However, when the crane unit has to pass the vertical frame elements of the elevated rail structure, the crane only has to "open" at the waterside longitudinal rail. This simplifies the construction of the crane units.

In one embodiment, the crane unit could comprise a winch mechanism which is mounted on the crane unit and a system of ropes or cables which run from the winch mechanism to the trolley, said system of ropes or cables being used to hoist the loads or the group of loads via the lifting device. This allows for the use of a lighter trolley, since the heavy lifting machinery can be located at a fixed location in a separate machinery house on the crane. This allows the trolley to move faster and with less power requirements.

In order to allow the ropes or cables of the system of ropes or cables to pass the vertical frame elements when the crane unit passes a vertical frame element, the crane unit could comprise a "boom tip trolley" which is displaceable along the boom in a direction which is essentially parallel with the centre line of the boom, is held in place at the front of the boom during normal operation of the crane unit and allows the ropes or cables to be pulled to the front of the boom. The boom tip trolley could also be displaceable such that it could be located dockside of the waterside longitudinal rail and that in this position of the boom tip trolley, the ropes or cables of the system of ropes or cables which are located underneath the waterside longitudinal rail are completely retracted dockside of the waterside rail.

In order to allow the compressive loads present in the boom of the crane unit to be supported, the boom could be designed such that at least some of the loads on the boom structure of the crane unit which are arranged in a direction which is essentially parallel to the centre axis of the boom are at least partially directed through a girder of the elevated rail structure which supports the longitudinal rail.

This could be arranged in that the crane unit further comprises a first roller arranged on the waterside of the girder and a second roller arranged on the dockside of the girder, said first and second rollers having rotation axes which are perpendicular to the centre axis of the boom and perpendicular to the axis of the longitudinal rail and said first and second rollers being arranged to run on one or more rails which are parallel to the longitudinal rail. The loads which are arranged in a direction which is essentially parallel to the centre axis of the boom are then transferred to girder via said rollers and rails.

In order to access the containers in a container bay of a ship which are located in front of a vertical frame element which supports the longitudinal rail of the elevated rail structure, the vertical frame members could be arranged such that they are displaceable in a direction which is parallel with the longitudinal rail.

In one embodiment, the longitudinal rail could be supported by a steel construction. This steel construction could be similar to the type of construction used when building steel bridges. Of course, the person skilled in the art will understand that there are many other ways of constructing the elevated rail structure.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

In the following, the invention will be described in greater detail with reference to embodiments shown by the enclosed figures. It should be emphasized that the embodiments shown are used for example purposes only and should not be used to limit the scope of the invention.

FIG. 7 shows a schematic side view of the plant.

FIG. 8 shows a schematic front view of the dockside longitudinal rail and frame member.

FIG. 9 shows a schematic front view of the waterside longitudinal rail and frame member.

FIG. 10 and FIG. 11 show schematic front views of two different configurations of the plant.

FIGS. 12-14 show schematic side views of three different steps when the crane unit is to be made ready to pass a vertical frame member.

FIG. 15 shows a detailed view of part of the boom which is arranged on the waterside longitudinal rail.

FIG. 16 shows a detailed view of part of the boom which is arranged on the dockside longitudinal rail.

FIGS. 17 and 18 shows a detailed side view of the waterside longitudinal rail and the crane unit in the vicinity of the waterside longitudinal rail.

FIG. 19 shows a cross section taken through the waterside girder supporting the waterside longitudinal rail.

DETAILED DESCRIPTION OF THE EMBODIMENTS

Figure 1:
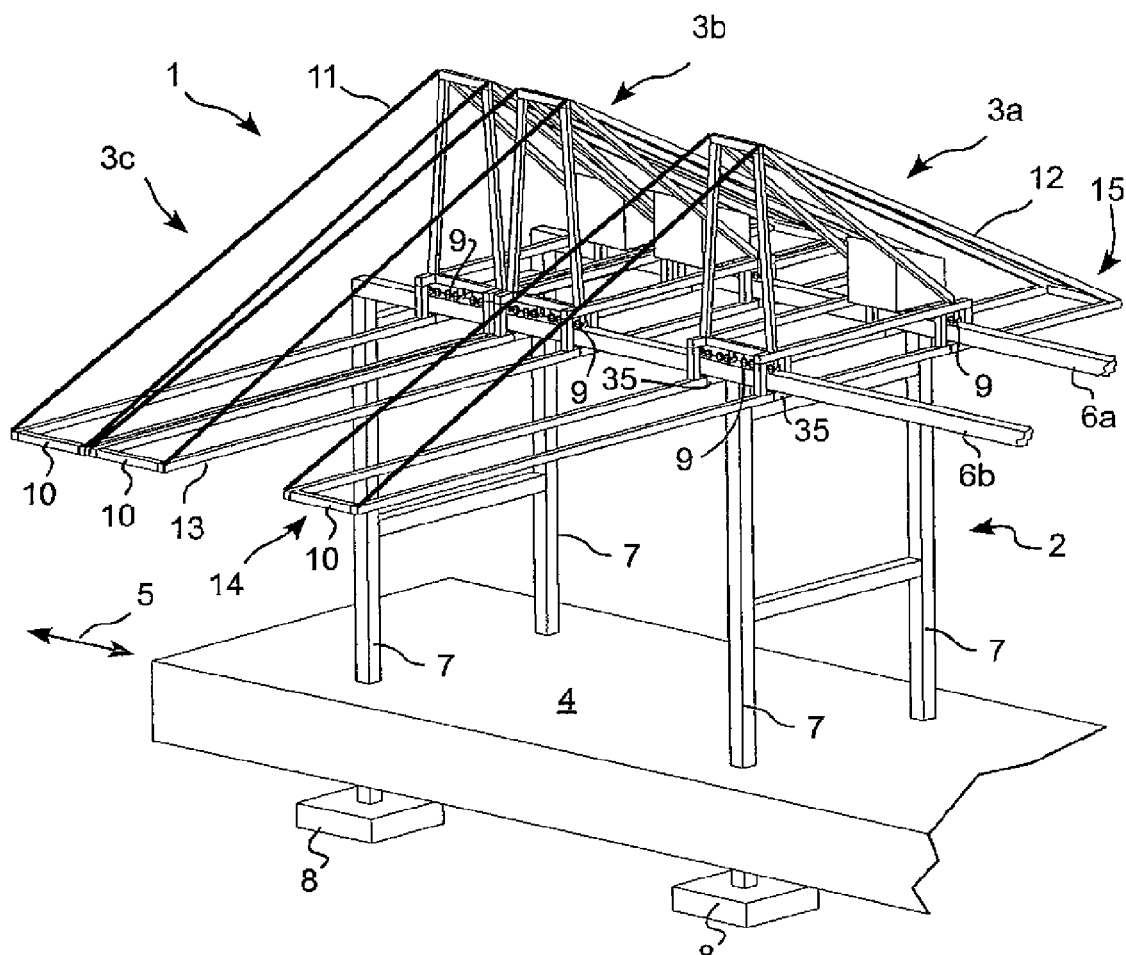
FIG. 1 shows a schematic perspective view of a first embodiment of a plant according to the current invention.
Figure 2:
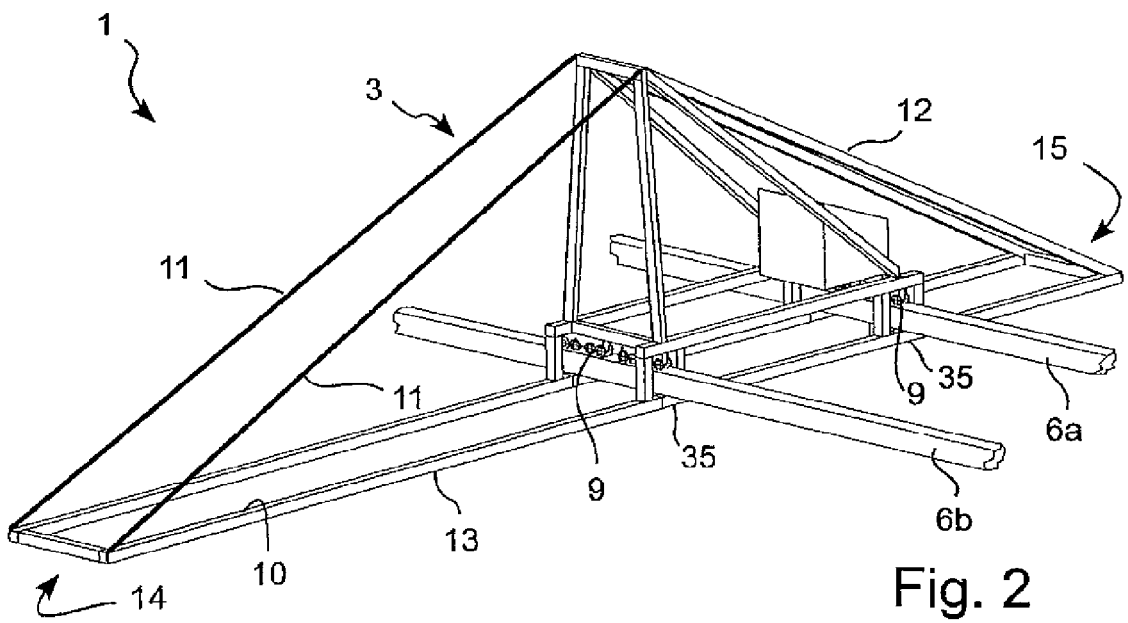
FIG. 2 shows a close-up schematic perspective view of a single crane unit of the plant shown in FIG. 1.

The plant 1 shown in FIG. 1, and shown in more detail in FIG. 2, comprises an elevated rail structure 2 and three crane units 3a, 3b, 3c. The elevated crane structure 2 and the crane units 3 are arranged on a wharf 4. A ship (not shown) will tie up to the wharf with the longitudinal axis of the ship arranged parallel to the longitudinal direction 5 of the wharf 4. A number of roads and/or rails (not shown) are arranged on the wharf in order to allow trucks, trains, etc to deliver cargo to the plant and/or remove cargo from the plant.

The elevated rail structure 2 is comprised of two longitudinal rails 6a, 6b which are arranged parallel to the longitudinal axis 5 of the wharf 4 and the longitudinal axis of the ship (not shown). The longitudinal rails 6 are supported by a number of vertical pillars 7. The vertical pillars 7 are supported by foundations 8 arranged underneath the surface of the wharf.

The crane units 3 are supported on the longitudinal rails by a set of wheels 9. The wheels 9 allow the crane units to move back and forth along the longitudinal rail. In this way, the crane units can move back and forth along the longitudinal axis of the wharf and the ship, thereby allowing the crane units to access any point between the front of the ship and the rear of the ship. In this way, the crane units can access any of the container bays of the ship.

Each of the crane units comprise a boom 10 which extends over the ship. The boom is supported by cables 11 and a framed structure 12 as is well known in the prior art. In this way, it is possible for the supports for the crane to be arranged on only one side of the ship.

The boom furthermore comprises a transverse rail 13 which runs along the bottom side of the boom 10. The transverse rail therefore runs along an axis which is parallel to the longitudinal axis of the boom and perpendicular or transverse to the longitudinal rails 6 of the elevated rail structure 2. A trolley (not shown) is attachable to the transverse rail such that it is displaceable, that is to say can move back and forth, along the transverse rail. The trolley is equipped with lifting means (not shown) which allow the cargo to be lifted from the ship and/or deposited on the ship.

Due to the arrangement of the longitudinal rails 6 and the transverse rail 13, the trolley can reach any point on the ship, by a combination of the movement of the crane unit on the longitudinal rails and the movement of the trolley along the transverse rail of the boom. Furthermore due to the construction of the crane unit 3, the trolley can operate on both sides of the support points of the elevated rail structure. In other words, the trolley can operate on both the side of the support points which are on the shipside of the elevated rail structure and the side of the support points which are on the landside of the elevated rail structure.

As can be seen from FIGS. 1 and 2, the boom 10 and therefore also the transverse rail 13, are arranged underneath the longitudinal rails 6. In this way, the transverse rail 13 is unbroken along the entire length of the boom 10. This allows the trolley to move from the front end 14 of the boom to the rear end 15 of the boom without any hindrances. In other words, the trolley can work on both sides of the longitudinal rails 6, both the side which is close to the ship and the side which is farthest from the ship. The motion path of the trolley is therefore the same as with other traditional crane units. However, the difference is that the container doesn't need to pass through the legs of the crane unit since the transverse rail along which the trolley moves is arranged underneath the longitudinal rail.

The front end 14 of boom extends past the forward most foundation or support point of the elevated rail structure. The trolley can in the example embodiment work on both sides of the supports of the elevated rail.

Figure 3:
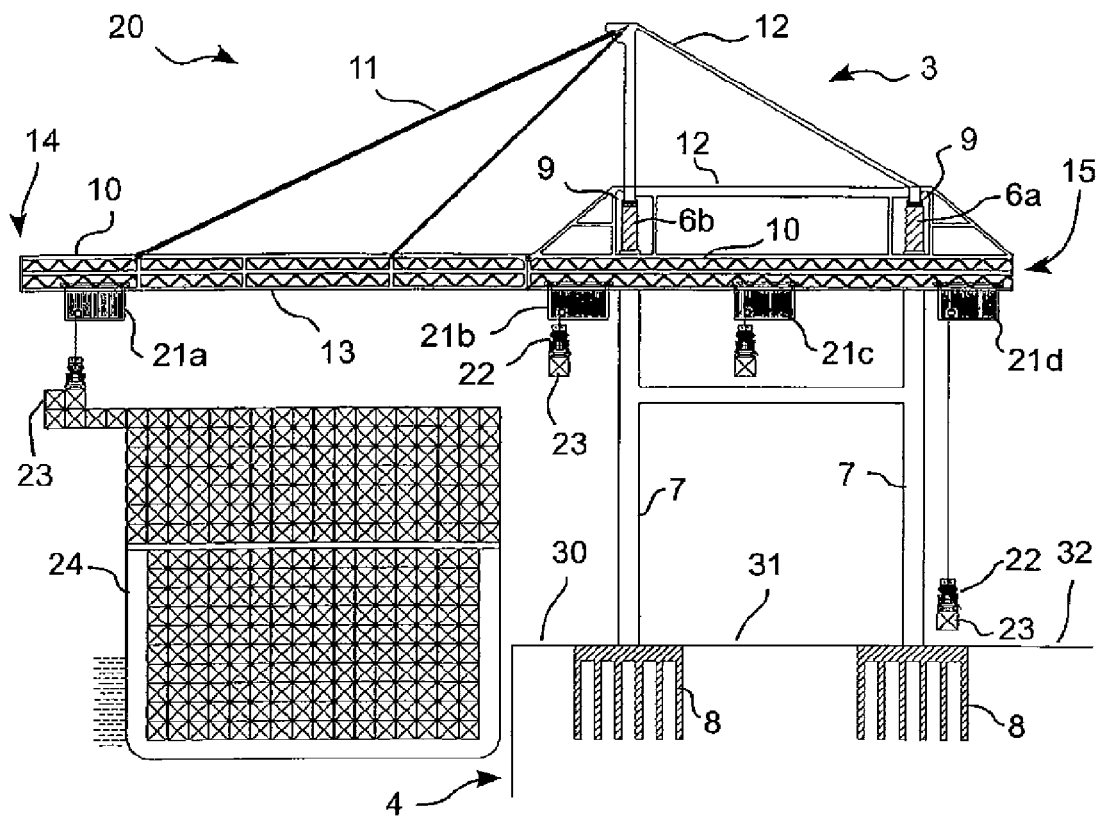
FIG. 3 schematically shows a second embodiment of a plant according to the current invention as a cross section side view defined by the line III-III in FIG. 4.
Figure 4:
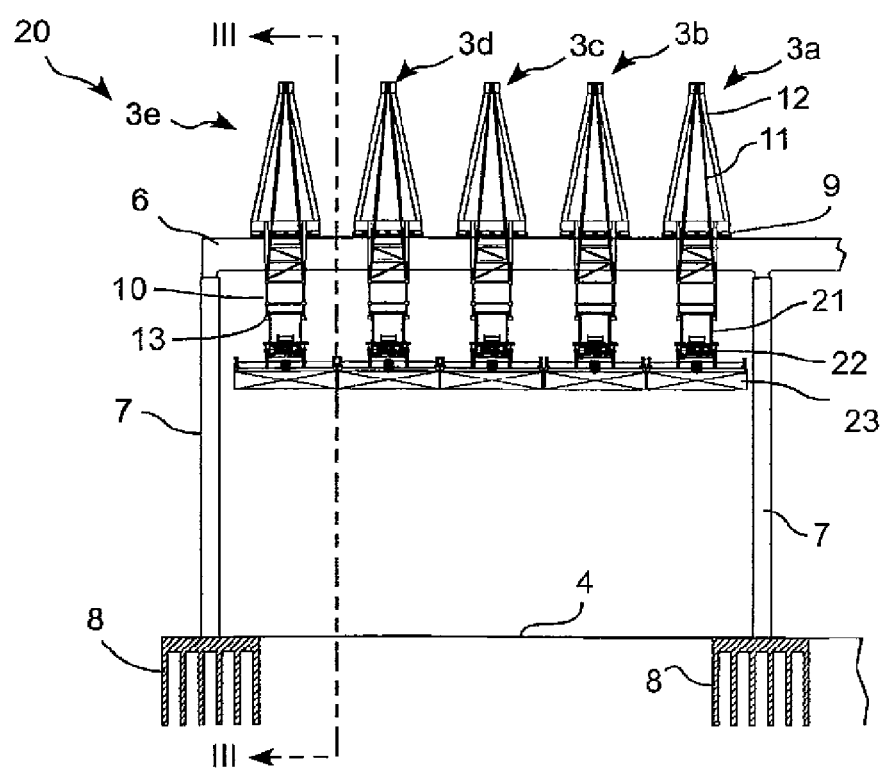
FIG. 4 schematically shows a front view of the plant shown in FIG. 3.
Figure 5:
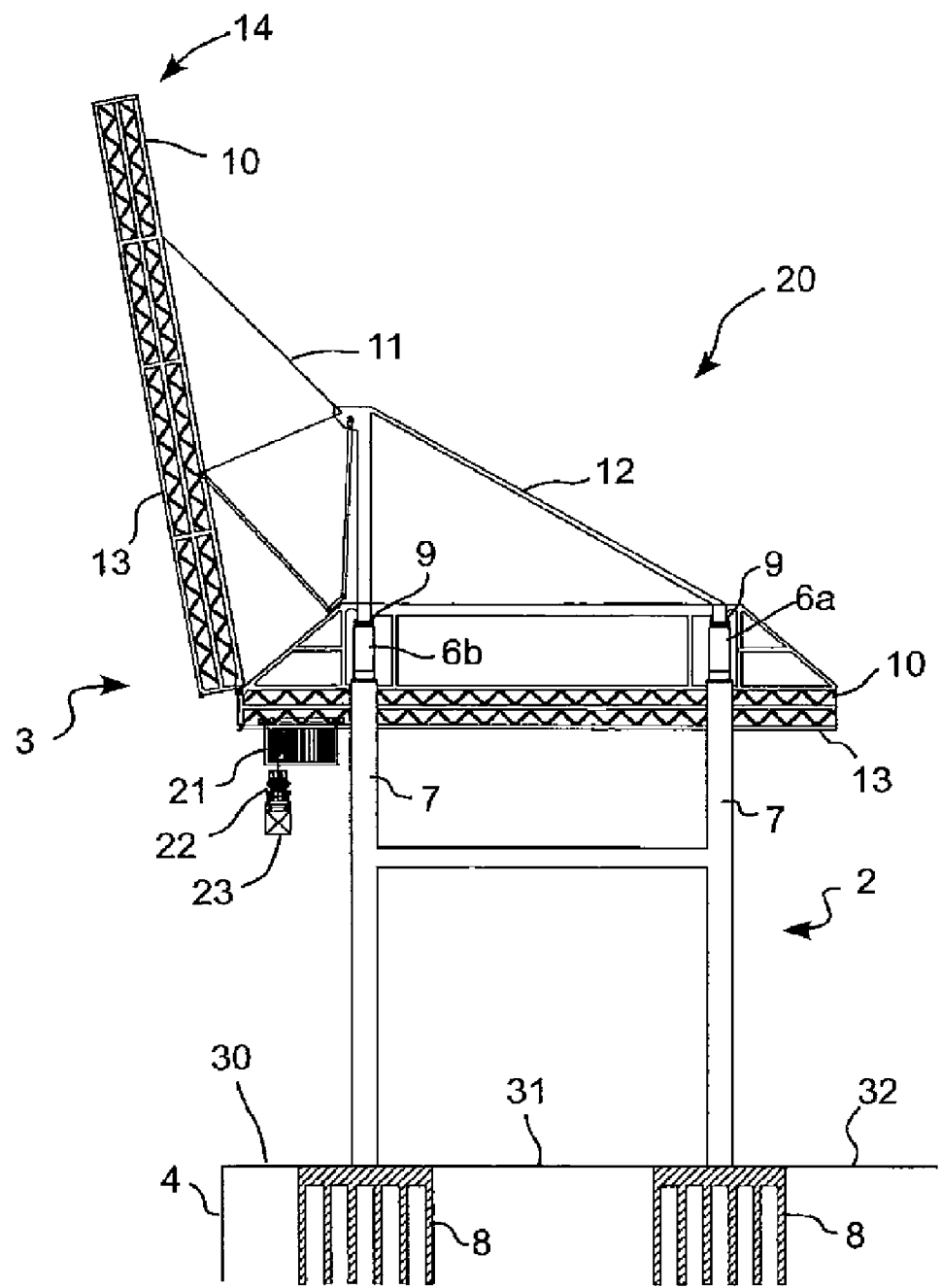
FIG. 5 shows a side view of the plant shown in FIG. 3 where the crane unit is in a retracted position.

The plant 20 shown in FIGS. 3-5 is another embodiment of the plant according to the invention, but the essential components are the same as those shown in FIGS. 1-2. The same reference numerals will therefore be used to describe the same elements.

As with the first embodiment 2, the plant 20 comprises an elevated rail structure 2 and a number of crane units 3. The elevated rail structure is arranged on a wharf 4. The elevated rail structure 3 comprises two longitudinal rails 6a, 6b which are supported by a number of vertical pillars 7. The vertical pillars 7 are supported by support points in the form of point foundations 8 at the base of each pillar. In one possible embodiment of an elevated rail structure, the vertical pillars will have a height of about 50 m, a longitudinal spacing of about 75 m and a transverse spacing of about 35-50 meters. The distance from the front pillar to the water could be around 13 m.

The crane units 3 are supported on the longitudinal rails 6 by wheels 9 which allow the crane units to independently move back and forth along the longitudinal rails. The crane units 3 also comprise a boom 10 which is supported by cables 11 connected to a framed structure 12. In the current example, the boom is shown as a single box girder, but it could also be many other forms, for example a double box girder. In a typical case, the crane units could have a weight of between 500 and 650 tons.

On the bottom side of the boom 10, there is a transverse rail 13. A trolley 21 is arranged which can move back and forth along the transverse rail. The trolley is equipped with a lifting device 22 which can lift cargo 23 from the ship 24 and deposit cargo 23 on the ship. In the example shown in the figures, the cargo comprises a number of containers 23. It should be noted that containers come in standard lengths of 20 feet and 40 feet. The lifting device of the trolley is therefore usually arranged such that it can either lift two 20 foot containers or one 40 foot container.

As can be seen from FIG. 3, the boom extends over the ship, thereby allowing the trolley 21 to access the entire width of the ship.

In order to fulfil one of the aspects of the current invention, the maximum width of the crane units is less than the width of a typical container bay, for example, the width of the crane units can be about 12 metres (~39 feet). In this way, two crane units can be arranged to work on two side by side container bays. This is illustrated in FIG. 4. The containers shown in FIG. 4 are 40 foot containers.

Figure 6A:
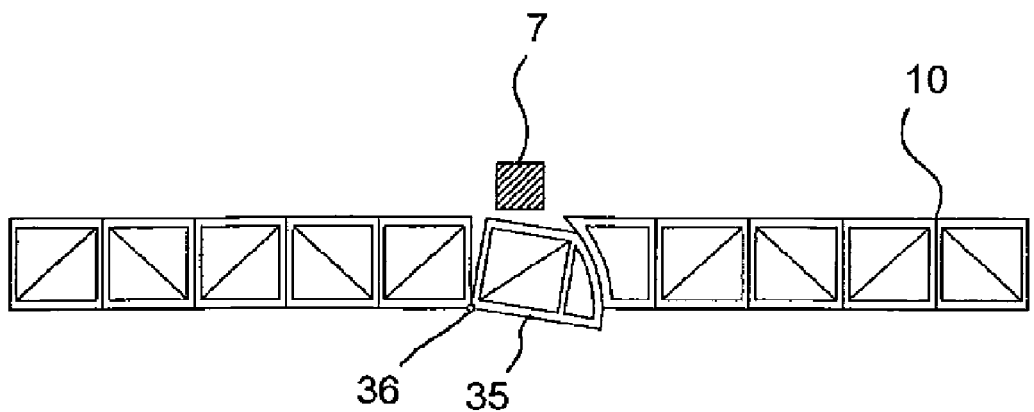
FIGS. 6a-6c schematically show a sequence of how one embodiment of a crane unit can move past a vertical pillar of the elevated rail structure.
Figure 6B:
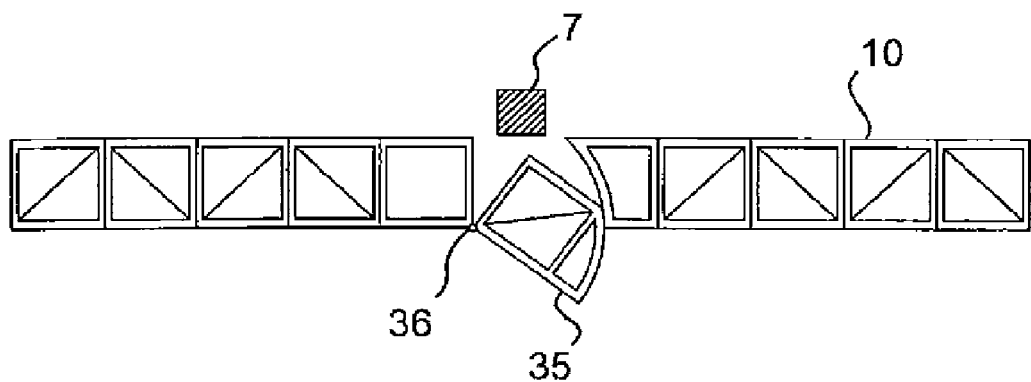
Figure 6C:
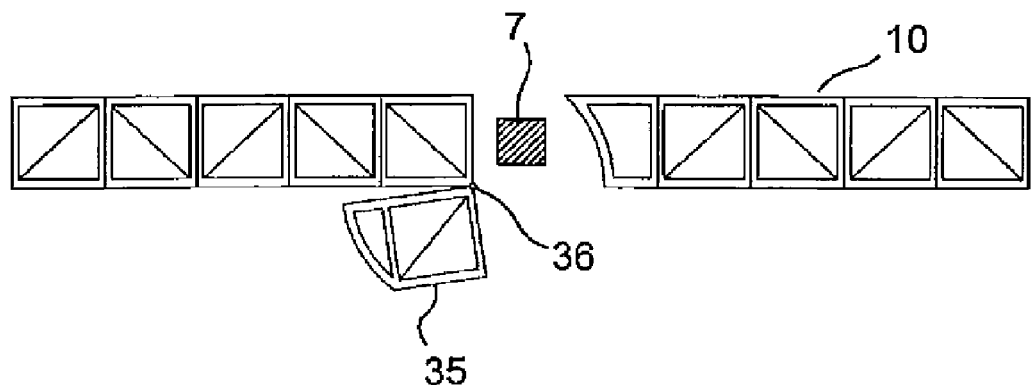

During reorganization of the crane units on the longitudinal rails, for example when a new ship comes into the harbour which has a different size and/or container bay organization than the previous ship, it is possible to move the crane units along the longitudinal rails. In order for the crane units to pass the vertical pillars, the boom 10 is arranged with a section 35 which can open up. One embodiment of such a section is shown in FIGS. 6a-6c. The section 35 is pivotably arranged about an axis 36 such that it can pivot to the side, thereby opening up the boom such that the boom can pass the pillar. It should be noted that in the embodiments shown in FIGS. 1-5, the boom 10 will have two sections which open up since there are two longitudinal rails 6a, 6b each supported by vertical pillars.

The trolley could be arranged in many different ways. One example is as a self propelled unit which is supplied with power via a bus bar system arranged on the boom of the crane unit. Another example is as a rope towed trolley. The rope towed trolley however can not be used directly in a situation where the crane unit has to pass a vertical pillar as described above, since the rope which is used to tow the trolley would need to be able to open up too. It should also be mentioned that the trolley could furthermore comprise means which allow the lifting device to be displaced along a direction which is perpendicular to the transverse rail. In this way, the lifting device can move in the same direction as the crane unit.

The wharf 4 can be dealt up into three areas, the area 30 between the water and the first vertical pillar, the area 31 between the two vertical pillars and the area 32 behind the second vertical pillar. Each of the areas 30,31,32 is provided with either roads and/or rails to allow vehicles, such as trucks and trains to receive or deliver cargo to the cargo plant 20. Due to the fact that the transverse rail is underneath the longitudinal rail, the trolley can reach all three areas without any problems.

However, in the case where a container bay is located in line with a vertical pillar, the crane unit will have to be arranged in a position which is does not allow the trolley to reach the areas 31, 32 behind the vertical pillar. This is for example shown by the crane unit 3a in FIG. 1. In this case, the trolley can load and unload to vehicles in the area 30 in front of the vertical pillar.

It should also be noted that in certain cases, the containers could be transferred directly to the wharf where they are picked up by container handling vehicles which transport the containers to a container stack. Containers can then be transported from the stack to trucks, trains, etc.

FIG. 5 furthermore shows the case where a ship is entering or leaving the wharf area. During this time, the boom of the crane units can be retracted to allow the ship to freely pass the crane units. This is standard for most ship to shore crane units.

FIGS. 7-20 shows different views of a third embodiment (40) of a plant according to the invention. The third embodiment shares many similarities with the first and second embodiments, and the same reference numerals will therefore be used to refer to the same components. Please note that the details of the components could be different in the different embodiments, even though the reference numerals are the same.

The plant of FIGS. 7-20 comprises an elevated rail structure 2 and a number of crane units 3. The elevated rail structure is arranged on a wharf 4. The elevated rail structure 3 comprises a waterside steel girder 41a and a dockside steel girder 41b. Each girder supports two longitudinal rails 6a, 6b. This means that in the current embodiment, there are two waterside longitudinal rails 6a and two dockside longitudinal rails 6b. A number of vertical frames 42 support the longitudinal steel girders above the wharf. The vertical frames 32 are arranged such that they can be displaced along the longitudinal axis of the elevated rail structure. The vertical frames are arranged with wheels at the top of the frames which roll on rails 43a, 43b on the bottom of the longitudinal steel girders as well as wheels at the bottom of the frames which roll on rails 44a, 44b on the surface of the wharf. The vertical frames are comprised of a waterside vertical pillar 45a and a dockside vertical pillar 45b and supporting members 46 arranged between the two vertical pillars. The vertical pillars can each be interpreted as vertical frame members using the terminology of the claims. It should be noted that depending on the stiffness of the vertical frames, it could be imagined that the wheels on the waterside vertical pillars and the wheels on the dockside vertical pillars are coordinated so that the vertical frames do not pivot as they are moved along the longitudinal rails.

In the current embodiment 40, the waterside longitudinal steel girder is located higher that the dockside steel girder. The reasons for this will be discussed later. Hence the waterside longitudinal rails 6a are located higher than the dockside longitudinal rails 6b.

In one possible embodiment of this elevated rail structure, the waterside pillars of the frame elements will have a height of 52.5 m and the dockside pillars of the frame elements will have a height of 35.7 m. The height of the waterside steel girder is about 7 m and height of the dockside steel girder is about 5.5 m. The width of the steel girders is about 3.5 m. The distance between the centre of the dockside pillar of the frame elements and the centre of the waterside pillar of the frame elements is about 55 m.

The crane units 3 are supported on the longitudinal rails 6a, 6b by wheels 9 which allow the crane units to independently move back and forth along the longitudinal rails. The crane units 3 comprise a boom 10 which is supported by cables 11 connected to a framed structure 12. The distance from the centre of the waterside vertical pillar 45a of the vertical frames 42 to the boom tip is about 70 meters and the distance from the centre of the dockside vertical pillar 45b of the vertical frames to the back of the boom is about 20 m.

On the bottom side of the boom 10, there is a transverse rail 13. The transverse rail could also be called a trolley rail. A trolley 21 is arranged on the transverse rail, said trolley being able to move back and forth along the transverse rail. The trolley is equipped with a lifting device 22 which can lift cargo 23 from the ship 24 and deposit cargo 23 on the ship. In the example shown in the figures, the cargo comprises a number of containers 23. It should be noted that containers usually come in standard lengths of 20 feet and 40 feet. The lifting device of the trolley of the current embodiment is of the kind which is arranged such that it can either lift four 20 foot containers or two 40 foot containers simultaneously.

The trolley 21 is powered via an electrical rail (Festoon runway). In this way, the trolley can move back and forth along the transverse rail 13 under its own power. However, in the current embodiment, the lifting device 22 is activated by cables 47 which are driven from a hoisting winch located in a machinery house 48 located at the rear of the crane unit. The cables are supported against sag along the length of the boom by catenary trolleys (not shown) in the conventional manner. A boom tip trolley 49 is arranged at the tip of the boom in order to pull the cables all the way to the front of the boom. A very simplified description of the cable routing is that the cables run from the machinery house to the front of the boom, around a pulley on the boom tip trolley, back to the main trolley 21, down to the lifting device, back to the main trolley and then back to the machinery house.

The boom tip trolley 49 is displaceable such that entire cable system can be retracted back along the boom. When the boom tip trolley is to be retracted, the main trolley 21 moves all the way out to the boom trip trolley and latches onto the boom tip trolley. The boom tip trolley is then mechanically released from the boom tip and the main trolley together with the boom tip trolley is moved back along the boom. As the boom tip trolley moves back along the boom, the slack in the cables is taken up by cable drums in the machinery house. When the cables are to be run from the tip of the boom again, the main trolley pushes the boom tip trolley to the tip of the boom, the boom tip trolley mechanically secures itself in position at the tip of the boom and the main trolley releases the boom tip trolley. The main trolley can then move back and forth along the boom while the boom tip trolley remains at the tip of the boom, allowing the cables to run from the tip of the boom. It should be noted that it could be imagined that the boom tip trolley could also be used in more conventional crane units as well.

Figure 7:
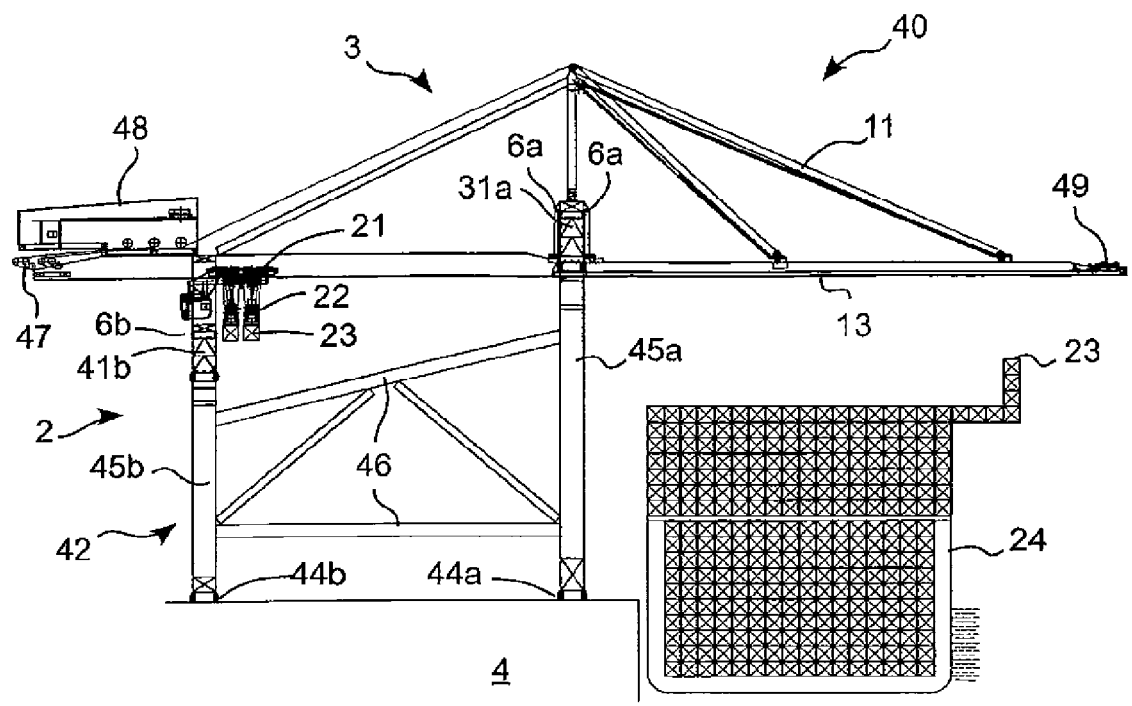
FIG. 7-19 show different views of a third embodiment of a plant according to the invention.
Figure 8:
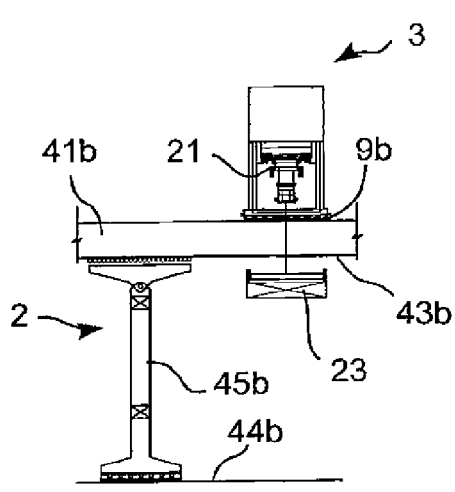
Figure 9:
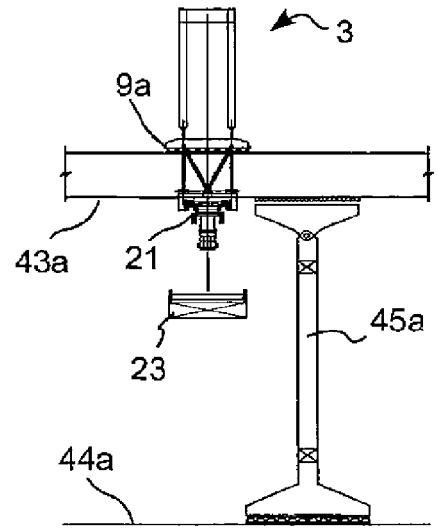
Figure 10:
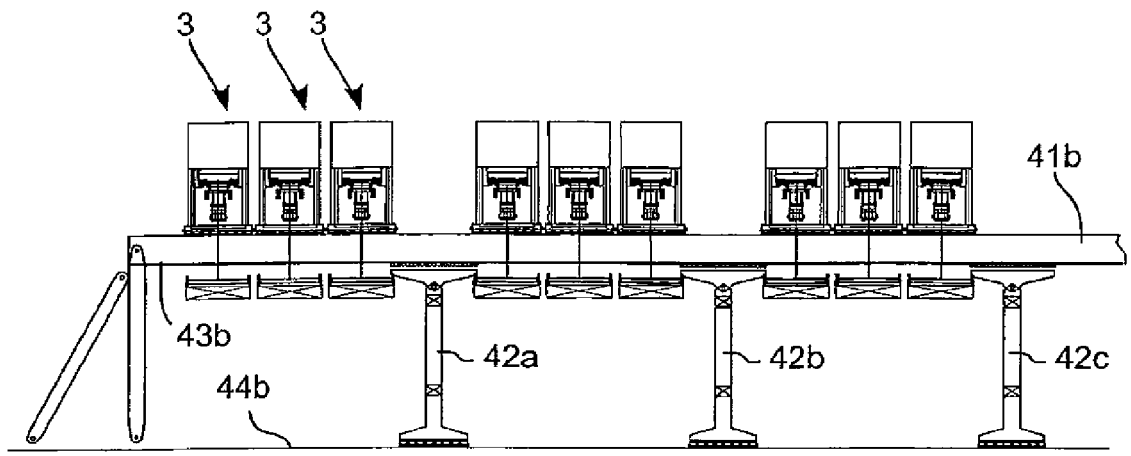
Figure 11:
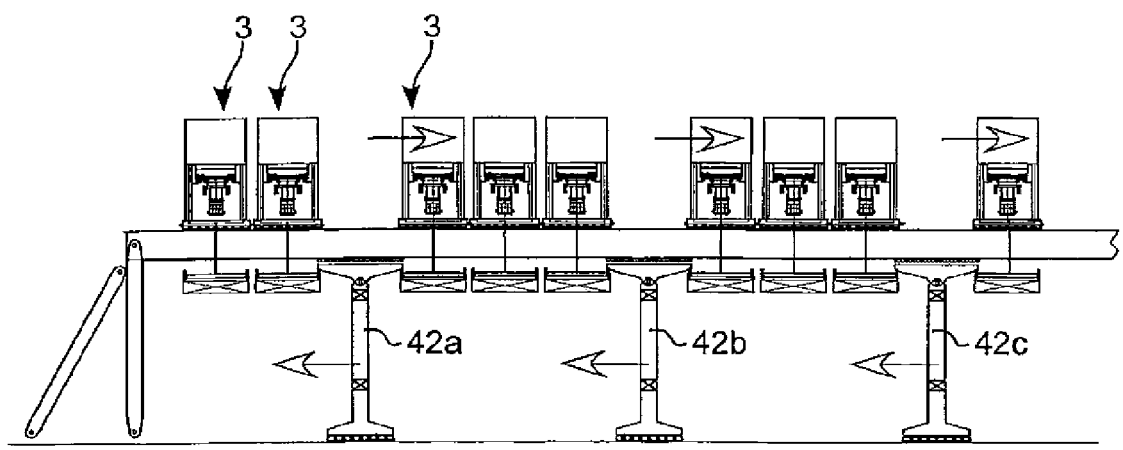

FIGS. 10 and 11 show front views of the plant of FIG. 7 where nine crane units 3 are arranged on the longitudinal steel girders 41b. Three vertical frames 42a, 42b, 42c support the longitudinal steel girders. The figures only show the dockside rail in order to simplify the figures. In FIG. 11, the vertical frames 42a,42b,42c have all been moved one container bay distance to the left when compared to FIG. 10. Likewise three crane units 3 have moved the distance of a container bay to the right. In this way, the container bays which in FIG. 10 were in front of frame elements, can now be accessed with the arrangement shown in FIG. 11.

In current embodiment, different arrangements of cranes and vertical frames were proposed. The girders in the current embodiment should be able to safely support three cranes on a 61 m span. Or four cranes on one 76 m span, but the adjacent spans can have no more than three cranes with 61 m spans. If there are no cranes on a span, the maximum span is 140 m. Of course, the person skilled in the art will understand that different arrangements are possible as long as the girder stresses are below the allowable. Furthermore, should it be desired to be able to handle more crane units per distance of girder, the girders can be made stronger.

Figure 12:
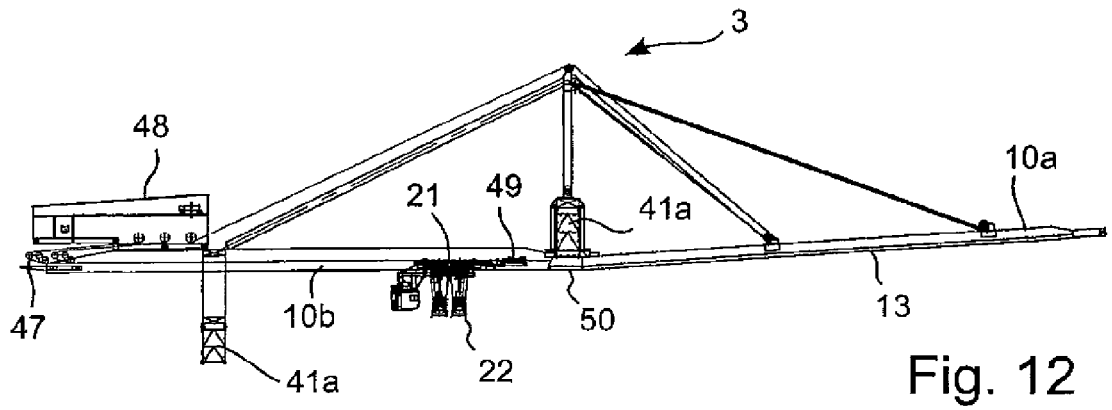
Figure 13:
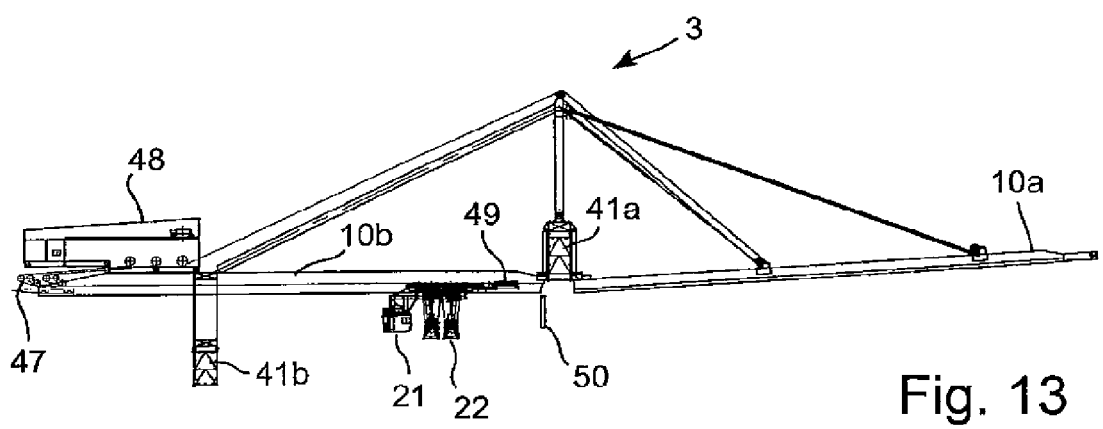
Figure 14:
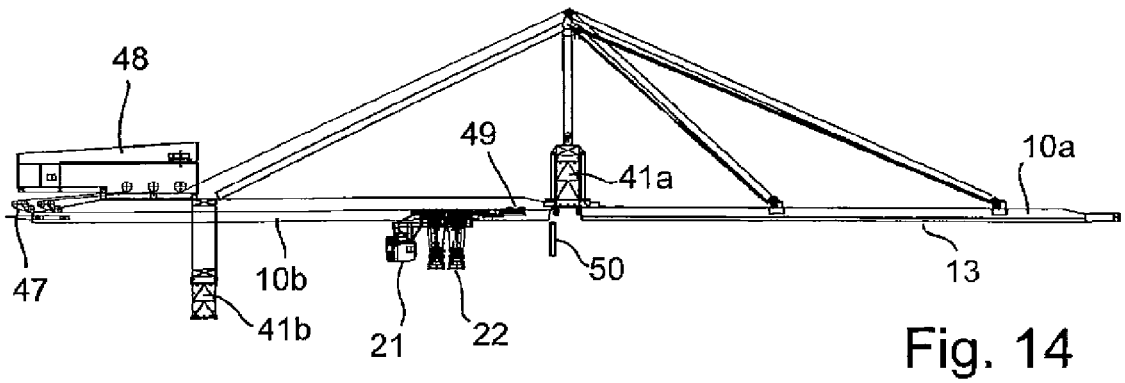

Since the transverse rails 13 of the crane units 3 are arranged underneath the waterside longitudinal rails 6a, the transverse rails need to be able to open in order for the crane unit to pass the waterside pillars of the vertical frames. FIGS. 12-14 show a portion of the steps required to pass the waterside vertical pillar.

FIG. 12 shows the boom tip trolley and the main trolley pulled back behind the waterside longitudinal girder 41a. In this way, all the cables are also located behind the waterside longitudinal girder. The boom is then lifted slightly. A trolley runway bridge 50 is then pivoted down as shown in FIG. 13. The boom is then lowered to its normal position as shown in FIG. 14. The crane can then pass the waterside pillar of the vertical frame. More details of the trolley runway bridge are provided in the discussion with regards to FIGS. 17 and 18. When the crane unit has passed the waterside vertical pillar of the vertical frame, the steps described above can be performed in reverse and the trolley runway bridge can be returned to its normal position, allowing the main trolley and the boom tip trolley to again run out to the tip of the boom.

Figure 15:
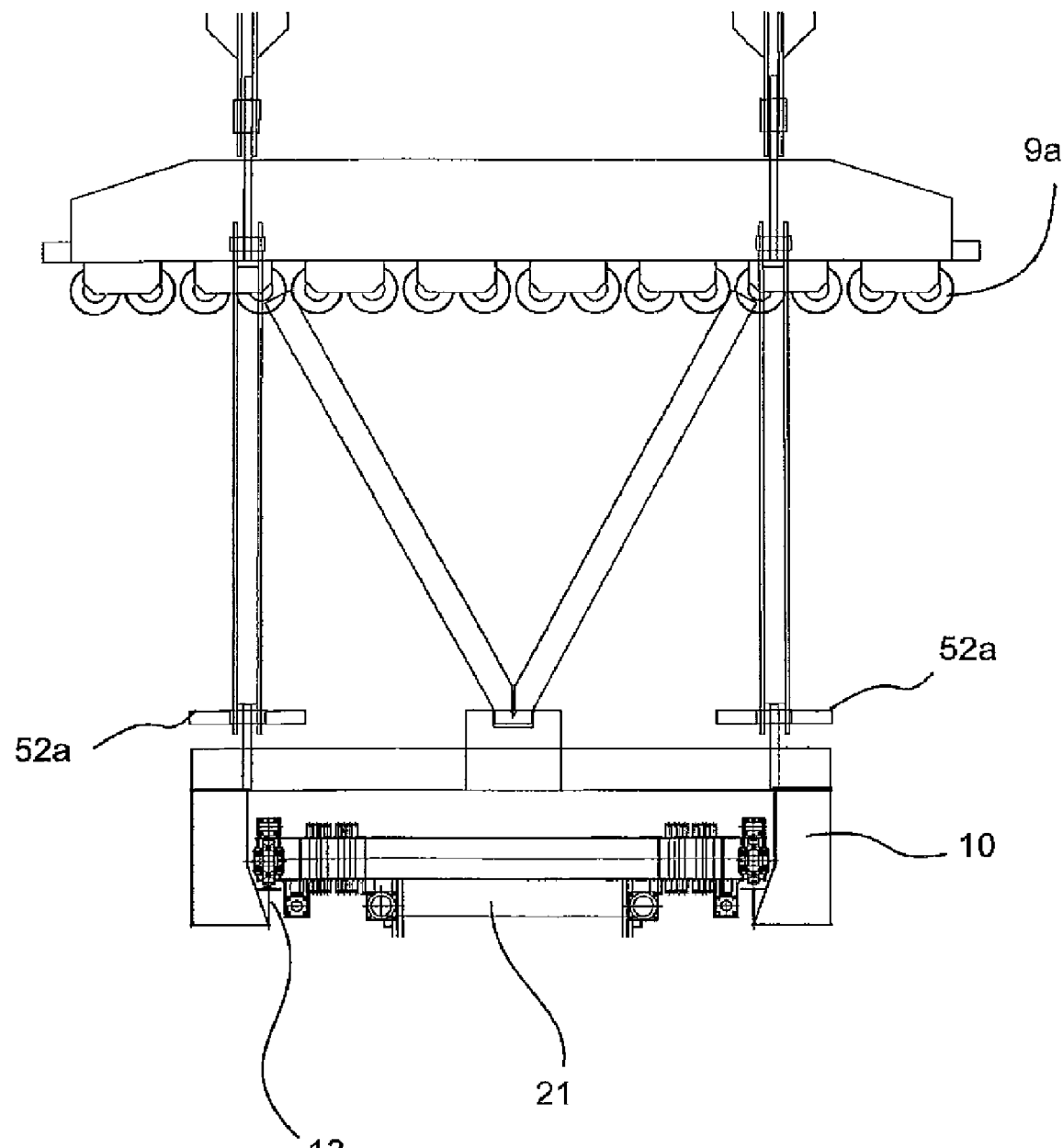

FIG. 15 shows a more detailed view of the crane unit at the position where the crane unit is supported by the waterside longitudinal rail 41a. As can be seen clearly in this figure, the wheels 9a which are supported by the longitudinal rail 6a (not shown) are above the transverse rail 13. The main trolley 21 can therefore move back and forth along the transverse rail going past the waterside longitudinal rail without any problems even when a container is being carried by the trolley. It should especially be noted that a container can pass the longitudinal rail, even if the container is being transported very near to the surface of the wharf. It is not necessary to lift the container over a rail as is required in many other types of crane constructions.

Figure 16:
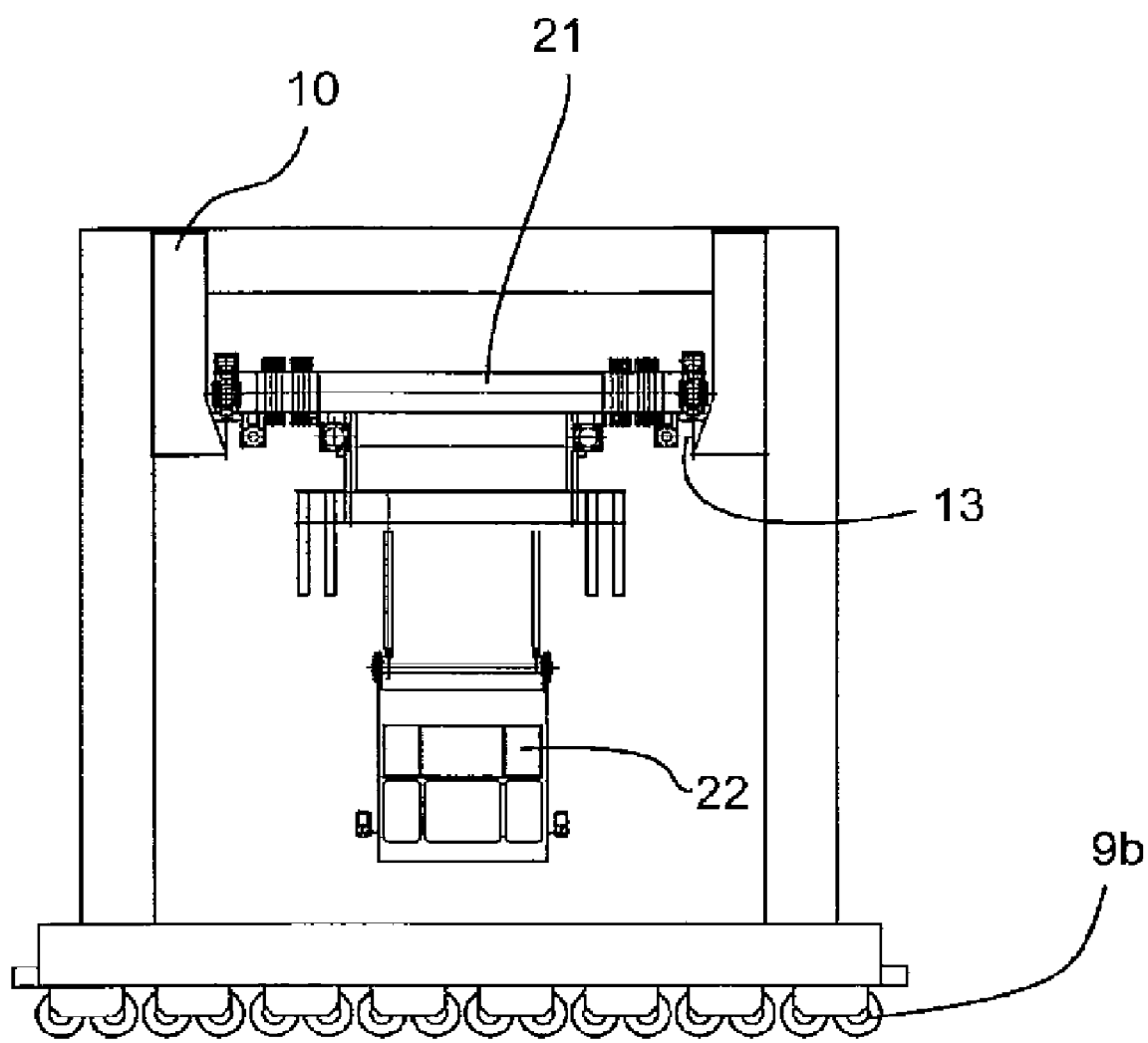

FIG. 16 shows a more detailed view of the crane unit at the position where the crane unit is supported by the dockside longitudinal rail. As can be seen, in this case, the wheels 9b which are supported on the dockside longitudinal rail 6b (not shown) are below the transverse rail 13 of the boom. Since the width of the crane unit is less than the width of a 40' container, a 40' container cannot pass the dockside rail. However, it should be noted that the trolley itself can easily pass the dockside rail if the lifting device 22 is raised to its upper position. As can be seen in FIG. 7, this allows the trolley to access points dockside of the dockside longitudinal rail if this is desired.

Since the mechanism which is required to open the transverse runway and allow the crane unit to pass the vertical pillars can be rather complicated, in the current embodiment it was decided to place the dockside longitudinal rail of the elevated rail structure below the transverse rail of the crane unit. This means that the containers cannot pass the dockside longitudinal rail, but it also means that only one mechanism for opening the transverse rail of the boom is required. The crane units can move past the dockside vertical pillars without any problems since the wheels 9b of the crane unit are located below the transverse rail. This is a question of priorities, which feature is more important.

Figure 17:
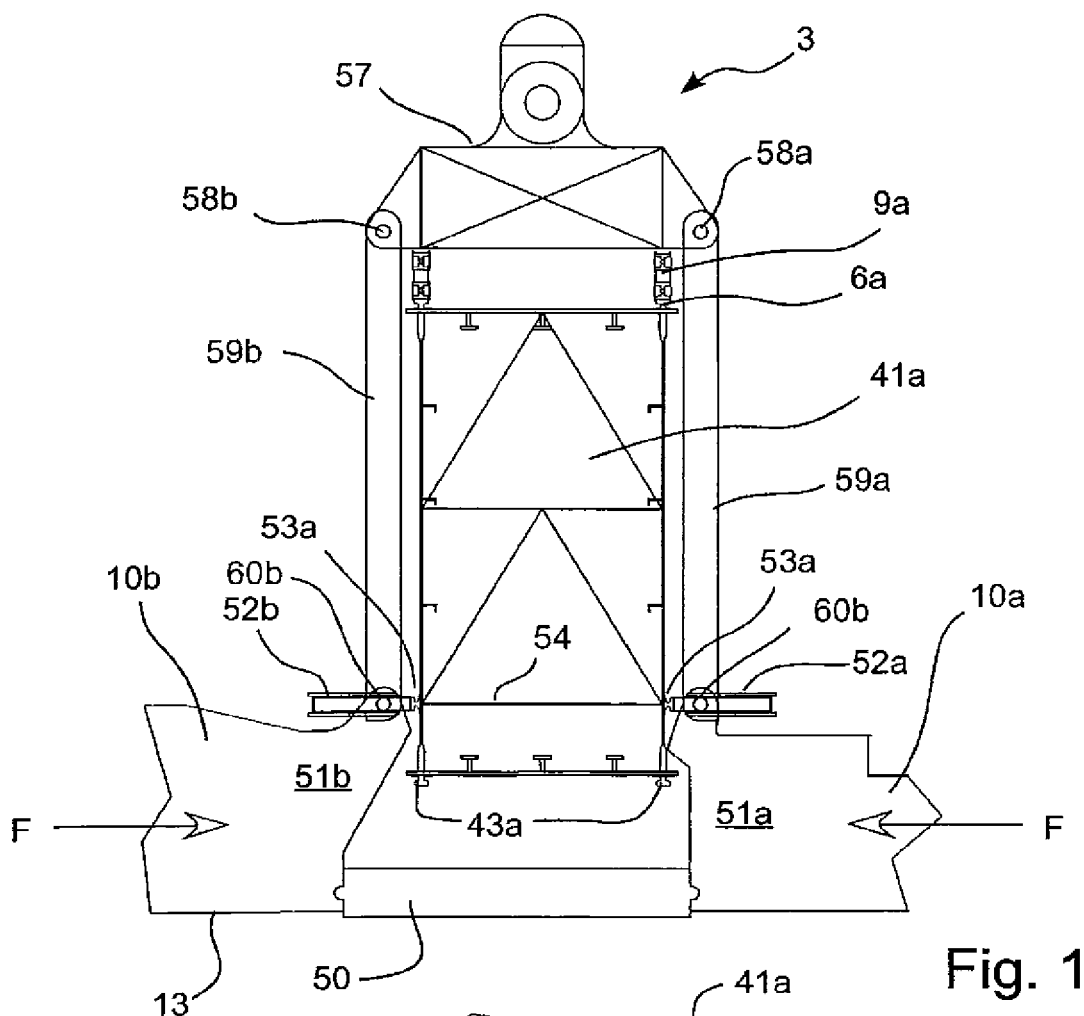
Figure 18:
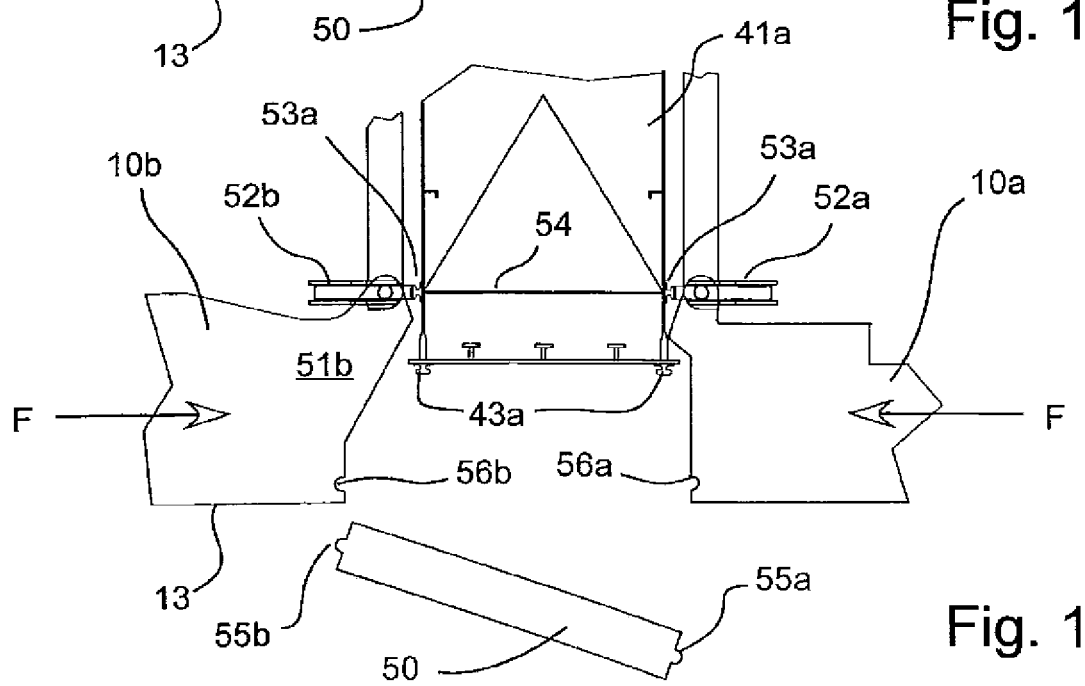

FIGS. 17 and 18 shows more details of the interface between the boom and the waterside girder 41a as well as the mechanism for opening the trolley runway bridge 50. As is well known, the boom of a crane unit experiences considerable compressive forces. These forces/loads are arranged in a direction which is essentially parallel with the centre axis of the boom. Since a portion of the boom needs to be able to open up when the crane unit has to pass the vertical pillars of the vertical frames, a system is required which prevents the boom from collapsing when the boom is opened. Furthermore, a mechanism is required which allows the trolley runway bridge to open in a simple manner. This is provided for by the current embodiment in that the compressive loads F in the boom are transferred to the longitudinal girder. The dockside end 51a of the waterside part of the boom 10a, is arranged to push on the waterside side of the longitudinal girder 41a. In the same way, the waterside end 51b of the dockside part of the boom 10b, is arranged to push on the dockside side of the longitudinal girder 41a. The interface between the boom and the girder is via a roller 52a, 52b attached to the boom 10a, 10b running on a rail 53a, 53b which is arranged on the waterside/dockside sides of the longitudinal girder respectively. The rail 53a, 53b is arranged parallel with the longitudinal rails 6a, 6b. In this way, when the crane unit is displaced sideways along the longitudinal rail, the boom rollers 52a, 52b allow the compressive forces to be transferred to the longitudinal girder. The compressive loads are supported within the girder by a beam arrangement 54 within the girder and which is arranged between the two rails 53a, 53b.

This construction also has the advantage that the compressive loads on the trolley runway bridge 50 can be reduced significantly. In fact, in the current embodiment, the trolley runway bridge experiences very little compressive forces due to the boom. The only design strength criteria for the trolley runway bridge is that it has to be able to support the trolley 21 itself.

The trolley runway bridge is provided with ball joints 55a, 55b which are arranged in corresponding ball joint sockets 56a, 56b located in the ends 51a, 51b of the boom girders 10a, 10b. When the trolley runway bridge is to be opened, the waterside part of the boom 10a is lifted slightly allowing the ball joints on the trolley runway bridge to slip free of the ball joint sockets on the boom girder ends. The trolley runway bridge can then be rotated down and the waterside part of the boom lowered down again to its normal position. When the trolley runway bridge is to be put in place again, the waterside part of the boom 10a is again lifted slightly, the trolley runway bridge pivoted up into the correct place again ensuring that the ball joints are aligned with the sockets and the waterside part of the boom lowered. In this way, the ball joints/sockets securely hold the trolley runway bridge in place.

It can also be seen from the figure, that the crane unit comprises a base unit 57 to which the wheels 9a are mounted which support the crane unit on the waterside longitudinal rail 6a. On either side of the longitudinal girder, the base unit comprises a pivot point attachment 58a, 58b. One end of a link 59a, 59b is pivotably connected to each of the pivot point attachments. The other end of the links are pivotably attached to pivot connection points 60a, 60b at the ends of the boom girders. In this way, the boom girders can be pivoted upwardly or downwardly as required. Furthermore, the boom girders can move outwardly away from the girder if required. One advantage of this is that changes in dimensions of the longitudinal girder doesn't affect the operation of the crane units. Such dimensional changes could be due to tolerances in manufacturing, thermal expansions, wear/damage, etc. . . .

Figure 19:
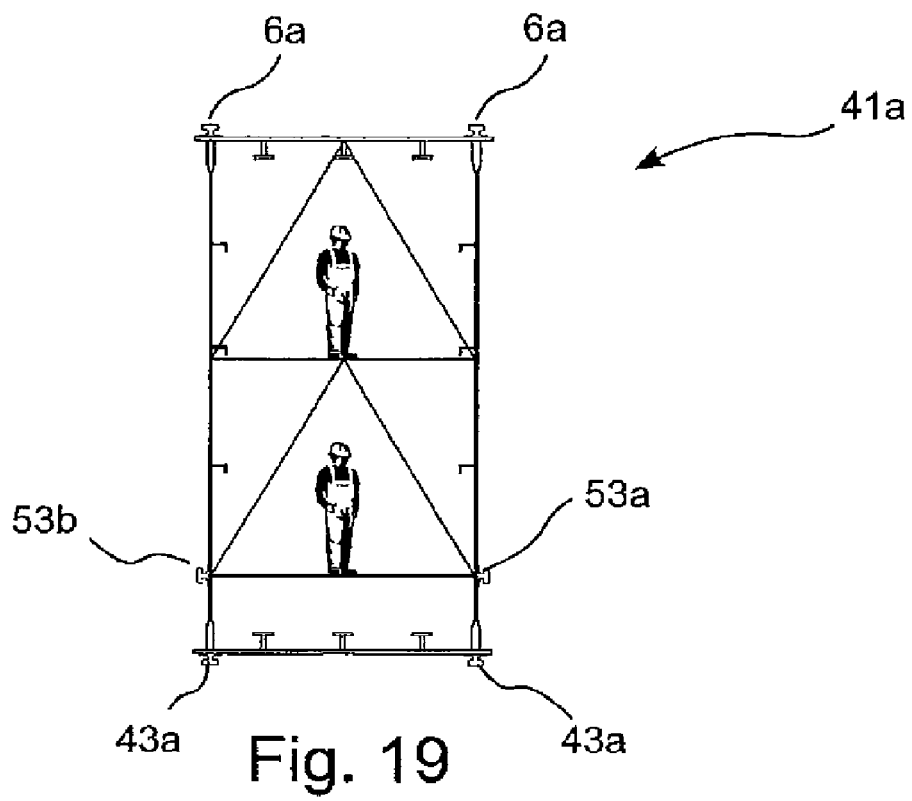
Figure 20:
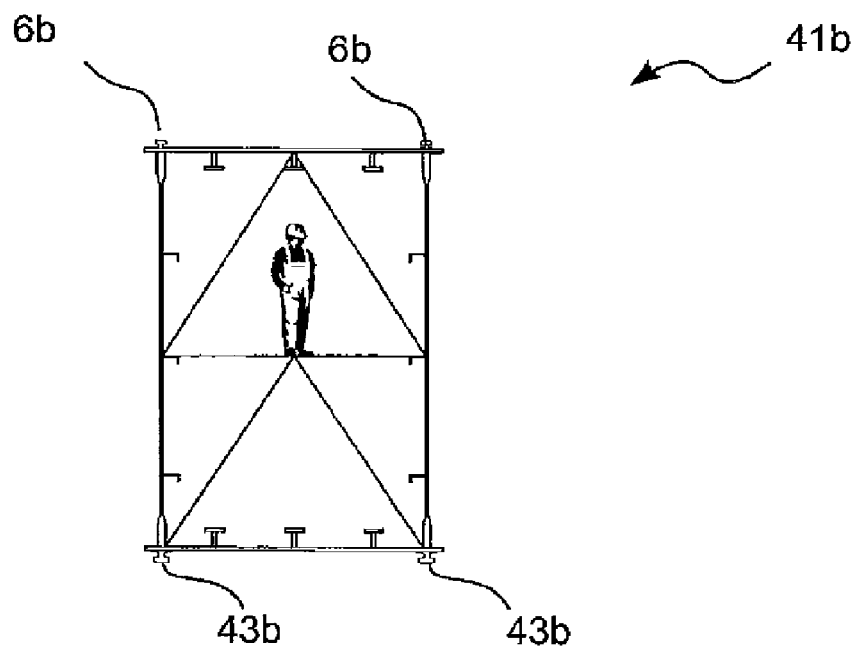
FIG. 20 shows a cross section taken through the dockside girder supporting the dockside longitudinal rail.

FIGS. 19 and 20 shows cross section views of the waterside and dockside longitudinal steel girders respectively used in the current embodiment. As can be seen from the figures, the girders are similar to the girders used in steel bridges This allows the steel girders to be built in a factory in units and then transported to the plant location by ship or other transportation means. This is in contrast to the first embodiment described above which was built from a concrete/steel structure. A concrete/steel type of structure needs to be built in the place where it will be assembled. Depending on the application, one or the other of these two options will be preferred.

It can also be seen from the figures that due to the dimensions of the girders, the interior and/or the exterior of the girders could be used to house different options. For example, equipment rooms, machinery rooms, office facilities, restrooms etc can be mounted on or in the girders. The interior can also be used to transport people from different areas of the structure to another area of the structure.

Figure 21:
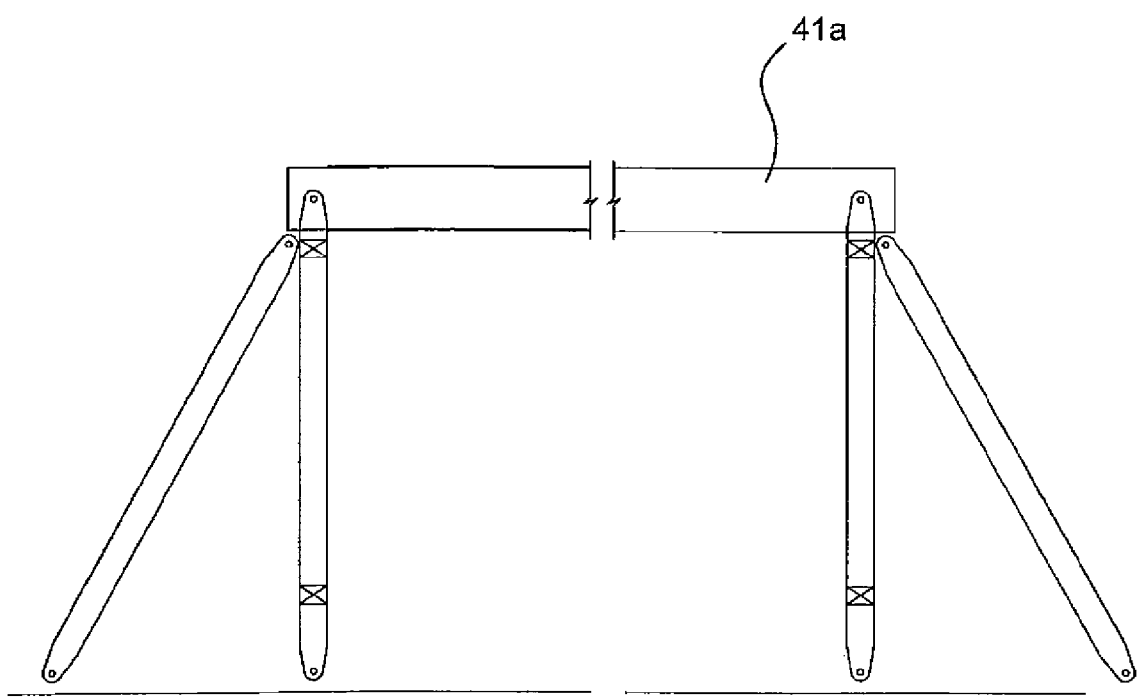
FIG. 21 shows a front view of the girder structure which supports the longitudinal rails.

FIG. 21 shows the elevated rail structure from the front. As an example, the longitudinal rail could be 1.2 km long. As can be seen from the figure, the ends of the longitudinal girders are supported in a manner which allows a certain amount of displacement. This allows changes in length of the girders due to thermal changes to be absorbed by the construction. In the embodiment shown, one end of the girders is a fixed support whereas the other end of the girders is pivotably supported.

It is to be noted that the figures and the above description have shown the example embodiments in a simple and schematic manner. The electronic and mechanical details have not been shown since the person skilled in the art should be familiar with these details and they would just unnecessarily complicate this description. For example, the actual construction of the structure has not been described in detail. The person skilled in the art of civil engineering should be able to use his or her ordinary knowledge to design the structure according to the invention. There are also many different options available when considering the material that the plant should be made of. One example could be that the elevated rail structure is manufactured from a combination of concrete and steel, however, many other options are available to the person skilled in the art. Also, it should be clear to the person skilled in the art that the dimensions given in the description of the embodiments were only used to give an example. The dimensions should not be used to limit the scope of the claims.

Furthermore, the figures have shown only a few of the possible embodiments which are encompassed within the scope of the current invention.

For example, in the figures, the elevated rail structure has been arranged as a part of the wharf. However, the foundations of the pillars could also be arranged separate from the wharf. The pillars could for example be arranged free standing on the sea bottom, and the wharf could be arranged as a floating wharf.

Furthermore, the figures have all shown two longitudinal rails and a number of crane units. However, it would also be possible to have a structure with only one longitudinal rail, or only one crane unit. Any combination of rails and crane units is possible.

It should also be noted that the figures have all shown a plant where containers are transferred between vehicles on the wharf and a ship. However, other options are also possible. For example, the plant could further comprise a container handling plant whereby containers are transferred from the ship via the crane unit, to the container handling plant which automatically stores the containers and makes them ready for transport to vehicles and/or other ships.

Furthermore, all the examples have shown a solution where the containers are transferred from the ship to the vehicle in a single motion. However, in certain cases, it could be imagined that the container is transferred from the ship to an intermediate lashing platform via the crane unit and then from the lashing platform to the wharf via a second mechanism. This could be useful in the case where the container bay is arranged in front of one of the vertical pillars of the elevated rail structure. In this case, the crane could for example transfer the container from the ship to a lashing platform arranged in front of the pillar. The lashing platform could then be arranged to slide the container sideways, past the vertical pillar and a second mechanism could be arranged behind the pillar which can take the container past the pillar.

It can also be mentioned that the embodiments shown in the current specification, have only shown crane units where the boom is arranged below the longitudinal rail. However, it should be clear to the person skilled in the art, that in certain cases, it could be advantageous to mix crane units with the boom below the longitudinal rail with crane units where the boom is arranged above the longitudinal rail. For example, the crane unit which is arranged in line with a vertical pillar of the elevated rail structure could be arranged with its boom above the longitudinal rail.

The figures have also only shown cases where the boom and transverse rail is located below the longitudinal rails. However, an embodiment could be imagined where the boom is arranged above the longitudinal rail, but the transverse rail is arranged below the longitudinal rail. For example, the transverse rail could be suspended from the boom. In this way, the boom would not have to be opened when moving past the vertical beam, only the transverse rail would need to be opened.

Furthermore, many additional features could be added to the plant without departing from the scope of the invention. For example, elevated platforms for storing hatch covers, driver cabs, extra lifting mechanisms etc could be added to the plant without departing from the invention.

In conclusion, it should be obvious to the person skilled in the art, that the embodiments shown in the current specification disclose certain features of the current invention, but should not be used to limit the scope of the invention as claimed.

The invention claimed is:

1. A plant for transferring cargo to and from a ship, said plant comprising an elevated rail structure and a crane unit;
   said elevated rail structure is arranged on one side of the ship and comprises a longitudinal rail which extends essentially parallel to the longitudinal axis of the ship;
   said crane unit is arranged to transfer a load or a group of loads to and from said ship, is supported by said longitudinal rail and is displaceable along said longitudinal rail;
   said crane unit furthermore comprises a boom and a trolley connected to the boom;
   said boom of said crane unit extends essentially perpendicular to the longitudinal rail such that one end of the boom extends over the ship;
   said boom of said crane unit comprises a transverse rail which extends in a direction which is essentially transverse to the longitudinal rail and essentially parallel to the centre line of the boom;
   said trolley is displaceable along said transverse rail of said boom; and
   said trolley of said crane unit comprises a lifting device for lifting said load or said group of loads;
   wherein said transverse rail of said boom is arranged underneath said longitudinal rail of said elevated rail structure, so that at least a portion of the transverse rail is directly below at least a portion of the elevated rail structure,
   wherein said elevated rail structure comprises two longitudinal rails, said two longitudinal rails comprising a shipside longitudinal rail and a dockside longitudinal rail, and
   wherein the dockside longitudinal rail is arranged underneath the boom and the transverse rail and the waterside longitudinal rail is arranged above the boom and the transverse rail.

2. The plant according to claim 1, wherein said plant comprises at least two crane units supported on the same longitudinal rail of the elevated rail structure.

3. The plant according to claim 1, wherein the width of the crane unit is less than the length of a standard shipping container.

4. The plant according to claim 1, wherein the elevated rail structure comprises a number of vertical pillars which support the longitudinal rail, said vertical pillars being supported by individual foundations.

5. The plant according to claim 1, wherein the plant further comprises a system of roads and rails whereby vehicles can transport cargo to and from the crane unit.

6. The plant according to claim 5, wherein at least one road and rail is arranged between the elevated rail structure and the ship.

7. The plant according to claim 1, wherein said boom and said transverse rail comprises a section which is openable to allow the boom and said transverse rail to pass a vertical beam of the elevated rail structure.

8. The plant according to claim 7, wherein said section is rotatably arranged around an axis which is perpendicular to the longitudinal rail and perpendicular to the transverse rail.

9. The plant according to claim 7, wherein said section is rotatably arranged around an axis which is parallel to the longitudinal rail.

10. The plant according to claim 1, wherein the length of the longitudinal rail is greater than two times the width of the crane unit.

11. The plant according to claim 1, wherein said crane unit comprises a winch mechanism mounted on the crane unit and a system of ropes or cables which run from the winch mechanism to the trolley, said system of ropes or cables being used to hoist the loads or the group of loads via the lifting device.

12. The plant according to claim 11, wherein said crane unit comprises a boom tip trolley which is displaceable along the boom in a direction which is essentially parallel with the centre line of the boom, is held in place at the front of the boom during normal operation of the crane unit and allows the ropes or cables to be pulled to the front of the boom.

13. The plant according to claim 12, wherein said boom tip trolley can be displaced such that it is located dockside of the longitudinal rail and that in this position of the boom tip trolley, the ropes or cables of the system of ropes or cables which are located underneath the longitudinal rail are completely located dockside of the longitudinal rail.

14. The plant according to claim 1, wherein at least some of the loads on the boom structure of the crane unit which are arranged in a direction which is essentially parallel to the centre axis of the boom are at least partially directed through a girder of the elevated rail structure which supports the longitudinal rail.

15. The plant according to claim 14, wherein the crane unit further comprises a first roller arranged on the waterside of said girder and a second roller arranged on the dockside of said member, said first and second rollers having rotation axes which are perpendicular to the centre axis of the boom and perpendicular to the axis of the longitudinal rail and said first and second rollers being arranged to run on one or more rails which are parallel to the longitudinal rail.

16. The plant according to claim 1, wherein the longitudinal rail of the elevated rail structure is supported at least in part by vertical frames and that the vertical frames are displaceable in a direction which is parallel with the longitudinal rail.

17. The plant according to claim 1, wherein the longitudinal rail is supported by a steel girder.

* * * * *